United States Patent
Hauber et al.

(10) Patent No.: US 10,457,027 B2
(45) Date of Patent: *Oct. 29, 2019

(54) SYSTEM AND METHOD FOR CONSTRUCTING COMPOSITE BUILDING BOARDS USING THERMOPLASTIC FILMS

(71) Applicant: CertainTeed Gypsum, Inc., Valley Forge, PA (US)

(72) Inventors: Robert J. Hauber, Land O Lakes, FL (US); Gerald D. Boydston, Cody, WY (US)

(73) Assignee: CertainTeed Gypsum, Inc., Malvern, PA (US)

( * ) Notice: Subject to any disclaimer, the term of this patent is extended or adjusted under 35 U.S.C. 154(b) by 918 days.

This patent is subject to a terminal disclaimer.

(21) Appl. No.: 14/817,740

(22) Filed: Aug. 4, 2015

(65) Prior Publication Data

US 2016/0052248 A1    Feb. 25, 2016

Related U.S. Application Data

(63) Continuation of application No. 13/170,272, filed on Jun. 28, 2011, now Pat. No. 9,096,036, which is a (Continued)

(51) Int. Cl.
    *B32B 5/02*      (2006.01)
    *B32B 37/00*      (2006.01)
    (Continued)

(52) U.S. Cl.
    CPC ...... *B32B 37/0053* (2013.01); *B28B 19/0046* (2013.01); *B28B 19/0092* (2013.01);
    (Continued)

(58) Field of Classification Search
    CPC ............ B28B 19/0092; B28B 19/0046; B28B 23/0006; C04B 28/14; C04B 2111/00629;
    (Continued)

(56) References Cited

U.S. PATENT DOCUMENTS

| | | |
|---|---|---|
| 4,265,979 A | 5/1981 | Baehr et al. |
| 4,378,405 A | 3/1983 | Pilgrim |

(Continued)

FOREIGN PATENT DOCUMENTS

CA      2070489 A1      12/1993

OTHER PUBLICATIONS

Celvol.RTM. Polyvinyl Alcohol—Solution Preparation Guidelines, Guidelines [online]. Sekisui Specialty Chemicals America, LLC http://www.celvol.com/sekisui/home.htm. Dec. 21, 2009 [retrieved on Sep. 15, 2011]. Retrieved from the Internet: <URL: http://www.celvol.com/sekisui/files/solution.sub.—preparation.sub.—guid-e.sub.—pvoh.sub.-1060.pdf>, pp. 14.

*Primary Examiner* — Joseph S Del Sole
*Assistant Examiner* — John Robitaille
(74) *Attorney, Agent, or Firm* — McDonnell Boehnen Hulbert & Berghoff LLP

(57) ABSTRACT

Disclosed are building board manufacturing techniques that minimize the build-up of slurry on associated forming equipment and also produce panels with enhanced physical properties. The methods involve applying a dissolvable film laminate to one or more fiber mats at the outset of the forming process. In the undissolved state, the film acts as a containment envelope for the gypsum slurry and any free floating glass fibers. During subsequent curing, the film is dissolved by vaporized water. In its dissolved state, the film is liquefied and coats the fibers of the underlying mat. This results in a building board with improved physical properties.

17 Claims, 4 Drawing Sheets

Related U.S. Application Data continuation-in-part of application No. 12/794,959, filed on Jun. 7, 2010, now Pat. No. 8,409,391.

(51) Int. Cl.

| | | |
|---|---|---|
| *B32B 13/04* | (2006.01) | |
| *E04C 2/04* | (2006.01) | |
| *B28B 19/00* | (2006.01) | |
| *B28B 23/00* | (2006.01) | |
| *B32B 37/12* | (2006.01) | |
| *B32B 37/14* | (2006.01) | |
| *E04C 2/24* | (2006.01) | |
| *E04C 2/28* | (2006.01) | |
| *B32B 7/12* | (2006.01) | |
| *B32B 13/14* | (2006.01) | |

(52) U.S. Cl.
CPC .......... *B28B 23/0006* (2013.01); *B32B 5/022* (2013.01); *B32B 5/024* (2013.01); *B32B 7/12* (2013.01); *B32B 13/04* (2013.01); *B32B 13/14* (2013.01); *B32B 37/1207* (2013.01); *B32B 37/14* (2013.01); *E04C 2/043* (2013.01); *E04C 2/246* (2013.01); *E04C 2/28* (2013.01); *B32B 2037/1215* (2013.01); *B32B 2255/02* (2013.01); *B32B 2255/26* (2013.01); *B32B 2262/101* (2013.01); *B32B 2307/102* (2013.01); *B32B 2307/212* (2013.01); *B32B 2307/3065* (2013.01); *B32B 2307/536* (2013.01); *B32B 2307/546* (2013.01); *B32B 2307/554* (2013.01); *B32B 2307/558* (2013.01); *B32B 2307/712* (2013.01); *B32B 2307/7145* (2013.01); *B32B 2307/732* (2013.01); *B32B 2419/00* (2013.01); *B32B 2607/00* (2013.01)

(58) Field of Classification Search
CPC ..... B32B 13/14; B32B 37/0053; B32B 5/022; B32B 5/024; B32B 7/12; B32B 13/04; B32B 37/1207; B32B 37/14; E04C 2/043; E04C 2/246; E04C 2/28
USPC .................................................... 156/39, 44
See application file for complete search history.

(56) References Cited

U.S. PATENT DOCUMENTS

| | | |
|---|---|---|
| 4,696,847 A | 9/1987 | Cousin et al. |
| 6,524,679 B2 | 2/2003 | Hauber et al. |
| 6,878,321 B2 | 4/2005 | Hauber et al. |
| 8,409,391 B2 | 4/2013 | Hauber et al. |
| 8,486,516 B2 | 7/2013 | Hauber et al. |
| 9,186,869 B2 | 11/2015 | Hauber et al. |
| 9,259,888 B2 | 2/2016 | Hauber et al. |
| 9,346,244 B2 | 5/2016 | Hauber et al. |
| 9,885,179 B2 | 2/2018 | Hauber et al. |
| 2002/0187296 A1 | 12/2002 | Hauber et al. |
| 2005/0202742 A1 | 9/2005 | Smith et al. |
| 2006/0035032 A1 | 2/2006 | Murphy et al. |
| 2009/0087616 A1 | 4/2009 | Hennis et al. |
| 2010/0055431 A1 | 3/2010 | College |

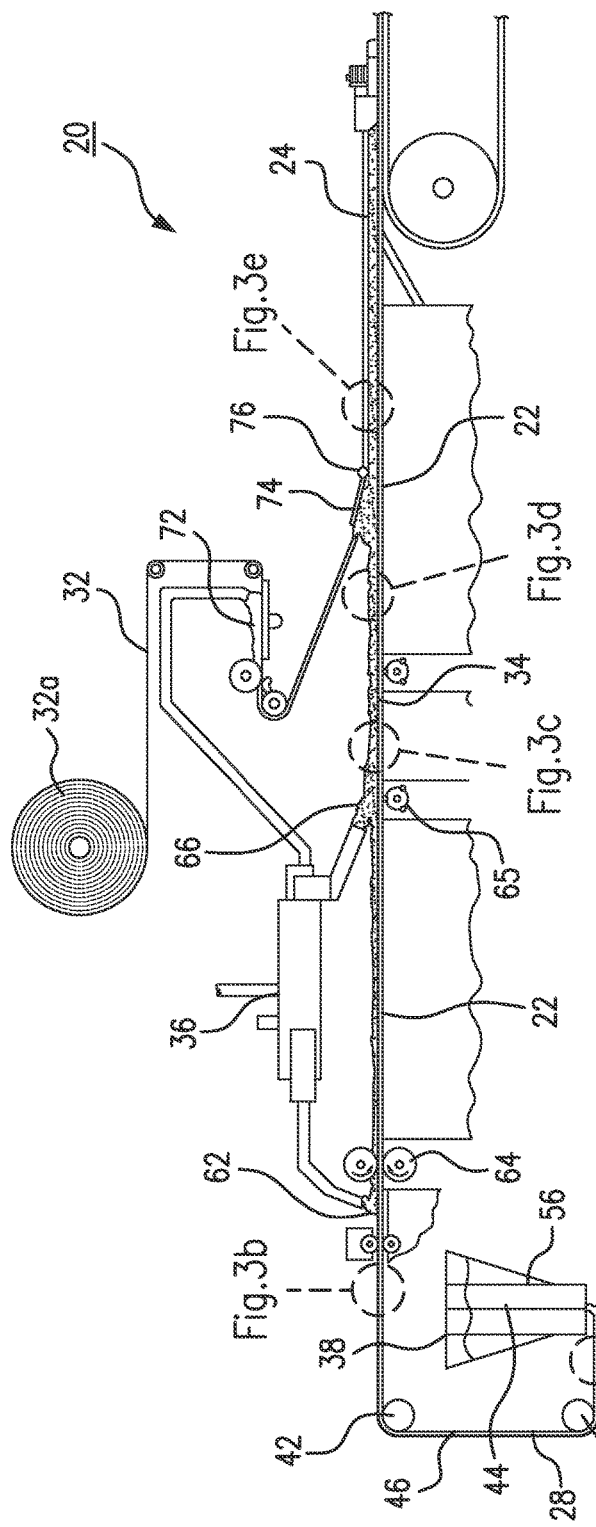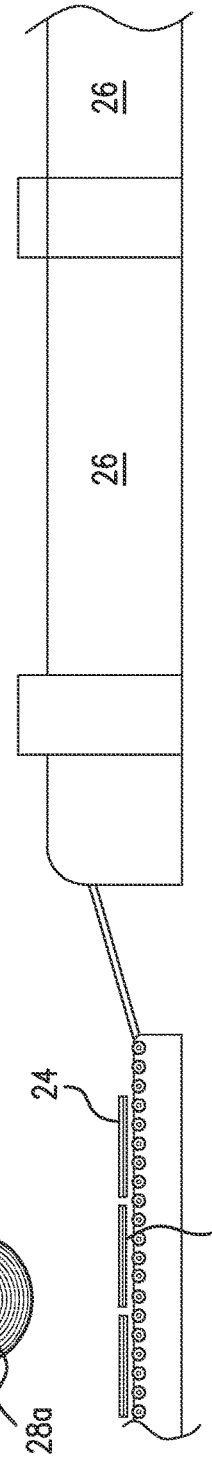

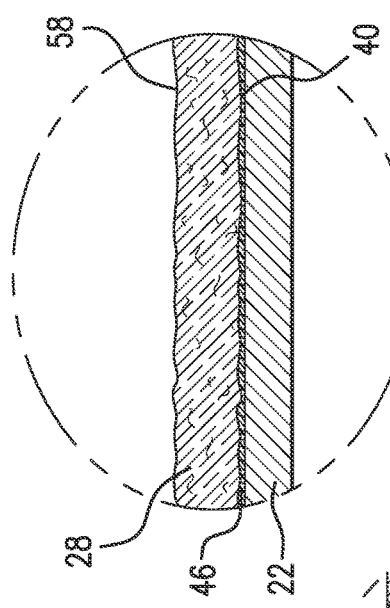
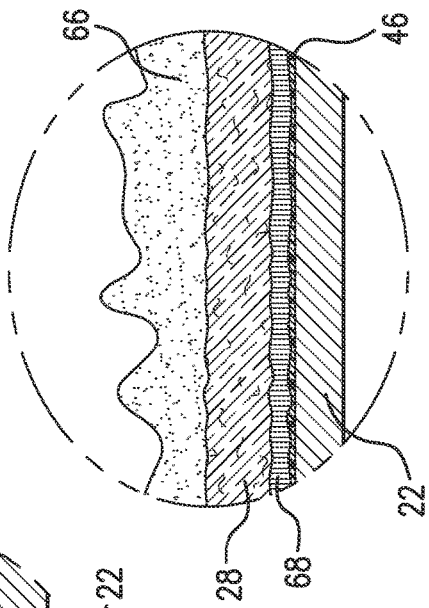
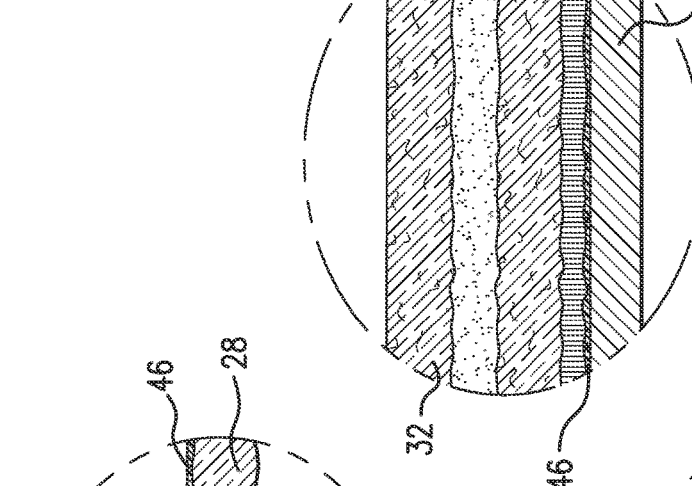
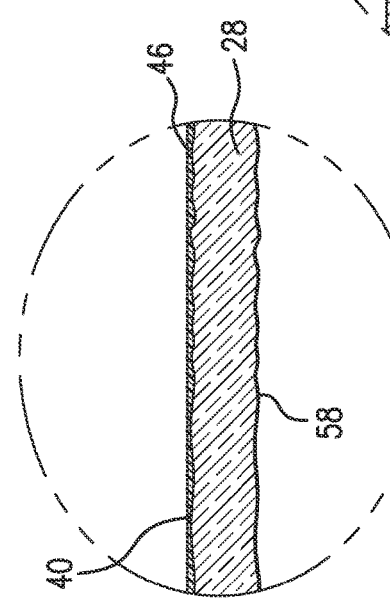
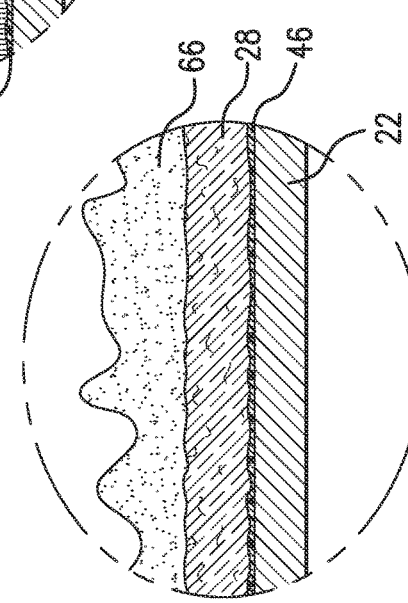

SYSTEM AND METHOD FOR CONSTRUCTING COMPOSITE BUILDING BOARDS USING THERMOPLASTIC FILMS

CROSS-REFERENCE TO RELATED APPLICATIONS

This application is a continuation of application Ser. No. 13/170,272, filed Jun. 28, 2011, and entitled "System and Method for Constructing Composite Building Boards Using Thermoplastic Films," now U.S. Pat. No. 9,096,036, issued Aug. 4, 2015, which itself is a continuation-in-part of application Ser. No. 12/794,959, filed Jun. 7, 2010, entitled "Method for Constructing Composite Building Boards using Dissolvable Films," now U.S. Pat. No. 8,409,391, issued Apr. 2, 2013. The contents of these applications are fully incorporated herein for all purposes.

BACKGROUND OF THE INVENTION

Field of the Invention

This invention relates to a system and method for constructing composite building boards. More particularly, the present invention relates to the use of thermoplastic coatings in the construction of composite gypsum building boards.

Description of the Background Art

Building board, also known as wallboard, plasterboard, or drywall, is one of the most commonly used building components in the world today. Building board is frequently used within the interior of a dwelling, where it functions both as a finished wall covering and as a structural room partition. Building board can also be used on the exterior of a dwelling, where it serves as a sheathing to provide weather protection and insulation. Building board can also be used as an interior facing for other structures as well, such as stairwells, elevator shafts, and interior ducting.

One particularly popular form of building board is known as glass reinforced gypsum (GRG) board. An example of one such board is disclosed in U.S. Pat. No. 4,265,979 to Baehr et. al. Baehr discloses a building board constructed from opposing glass fiber mats with an intermediate gypsum core. This construction provides a hardened external surface and is an improvement over earlier paper faced boards.

Current GRG manufacturing techniques have some significant drawbacks. Namely, during construction, some of the individual mat fibers are not covered by the gypsum slurry core and are therefore exposed. These fibers have a tendency to dry out and disengage from the board. As a result, free floating glass fibers tend to accumulate on and damage associated forming equipment, such as forming tables, forming plates, motor drives, bearings, and the like. The presence of disengaged fibers also presents a significant hazard to workers who must wear appropriate safety masks so as not to ingest the fibers. The most common way to combat this problem is through the use of expensive dust collection equipment and/or the periodic and repeated cleaning of the forming equipment.

A subsequent board manufacturing technique is described in commonly owned U.S. Pat. No. 4,378,405 to Pilgrim. The contents of the Pilgrim patent are fully incorporated herein by reference. Pilgrim discloses a GRG board that is faced on one or both sides with a porous, nonwoven glass mat. The glass mat of Pilgrim is slightly but fully embedded into the slurry core. This is accomplished by vibrating the gypsum slurry to cause it to pass through the porous openings in the mat. Embedding the mat within the core as taught in Pilgrim results in a thin film of slurry being formed on the outer surface of the board. Building boards with this construction are referred to as embedded glass reinforced gypsum (EGRG) boards.

EGRG boards eliminate, or greatly reduce, the presence of exposed fibers and greatly reduce the presence of free floating fibers. However, the construction of EGRG boards also has its drawbacks. Namely, EGRG boards require the application of low viscosity gypsum slurry. This slurry leaks from the boards during manufacture and accumulates on associated forming equipment. Thus, during manufacture, the forming tables, forming belts, and associated rollers and motors are exposed to substantial build-ups of gypsum slurry. Over time, if not regularly cleaned, the manufacturing process comes to a complete stop. Thus, in traditional GRG and EGRG building board manufacturing techniques there is a substantial capital investment in equipment designed to clean the forming areas.

Additionally, even in the construction of EGRG boards, there is a continuing problem with some fibers becoming exposed, dried and detached. This, in turn, results in the accumulation of free fibers on the forming tables, forming belts and associated rollers and motors. As with the excess gypsum slurry, these fibers must be removed in order to prevent equipment failure resulting in downtime.

Thus, there exists a need in the art for improved building board manufacturing techniques. More specifically, there is a need in the art for manufacturing techniques that minimize the accumulation of gypsum slurry and/or free floating fibers on associated forming equipment. There also exists a need to minimize capital investment needed to construct GRG and EGRG building boards. There is yet another need to economically produce GRG and EGRG building boards with improved physical characteristics. The present invention is aimed at achieving these objectives.

SUMMARY OF THE INVENTION

One advantage of the present method is realized by applying a thermoplastic film to the surface of a composite building board.

Another advantage is achieved by applying a thermoplastic film to the surface of a building board in an in-line manufacturing process.

Another advantage is accomplished by limiting the build-up of slurry on forming equipment associated with board production.

Yet another advantage is achieved by constructing fiber reinforced building boards that minimize and/or eliminate the presence of exposed and/or free floating fibers.

Still yet another advantage is accomplished by forming a thin slurry layer between a mat and an adjacent thermoplastic layer.

Another advantage is attained by using a thermoplastic layer in the construction of building boards, wherein the layer acts as a containment envelope for slurry and glass fibers.

Still yet another advantage is realized by forming a building board using an outermost thermoplastic layer, wherein the thermoplastic layer minimizes slurry leaking from the face of the board.

Still yet another advantage is that, once produced, the boards obtain a thermoplastic layer that may be utilized as a base layer for additional coatings or surface treatments. The use of an existing plastic layer in this manner can be in reduction of additional coating weights, modification of texture and or compounding with secondary coating layers.

All of these advantages lead to more economical panel production and increased panel functionality and customization.

Various embodiments of the invention may have none, some, or all of these advantages. Other technical advantages of the present invention will be readily apparent to one skilled in the art.

BRIEF DESCRIPTION OF THE DRAWINGS

For a fuller understanding of the nature and objects of the invention, reference should be had to the following detailed description taken in connection with the accompanying drawings in which:

FIG. 1 is an elevational view of the first part of the manufacturing process wherein the slurry is supplied between facing mats;

FIG. 2 is an elevational view of the second part of the manufacturing process wherein the building panels are dried.

FIGS. 3a-3e are successive cross sectional views of the building panels taken from FIG. 1.

Similar reference characters refer to similar parts throughout the several views of the drawings.

DETAILED DESCRIPTION OF THE PREFERRED EMBODIMENT

Figure 3F:
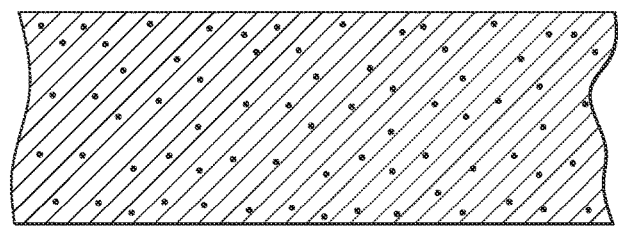
FIG. 3f is a bottom plan view of the board showing the slurry bleeding through the board surface.

The present invention relates to a system and method for manufacturing thermoplastic coated building boards. The system and method can be used to produce both glass reinforced gypsum board (GRG) and embedded glass reinforced gypsum board (EGRG). The thermoplastic coating is applied to a mat prior to board formation. The coating can be applied in-line or off-line with respect to the remaining production line. The coating acts as a containment envelope between an exterior, or contacting, surface of the mat and the underlying forming belt. The coating also retains a thin layer of gypsum slurry on the exterior surface of the mat. This reduces contamination of the production line and produces boards with increased physical properties.

FIG. 1 illustrates a gypsum board production line 20 that has been modified in accordance with the present disclosure. Line 20 includes a series of forming tables 22 for supporting the building panel 24 during its formation. As is known in the art, the mats that form panel 24 are under tension by way of a series of downstream belts. Once panel 24 has been formed, it is passed to a series of board dryers 26. Dryers 26 function in driving out excess moisture and causing the gypsum slurry to set. This results in the formation of a dried composite panel 24.

As further noted in FIG. 1, gypsum board 24 is formed from first and second mats (28 and 32) between which a volume of gypsum slurry is deposited. These mats are initially stored in large rolls (28a and 32a) that are unwound to provide a continuous length of mat. First roll 28a is unwound onto forming table 22. Slurry 34 is thereafter deposited upon the mat from an overhead mixer 36 at various downstream locations. Second roll 32a is ideally positioned downstream of first 28a roll and is unwound over top of the deposited gypsum core to create sandwich or panel.

Mats (28 and 32) are preferably constructed from a series of nonwoven, randomly aligned glass fibers. Mats (28 and 32) may also comprise continuous or non-continuous fibers, organic or inorganic fibers, woven or nonwoven fibers, or blends thereof. The fibers may also be continuous in length, chopped non-continuous in length, identical or random in length, of blends thereof. The fibers within mats (28 and 32) ideally have lengths of between ½" to 2." Mats (28 and 32) preferably have a thickness of between about 0.0625" to 0.5"

Mats (28 and 32) are also preferably pre-coated with an organic or inorganic resin binder to hold the individual fibers together. Additionally, mats (28 and 32) can be supplied uncoated, with the resin binder being applied at a point along production line 20. However, the disclosed method can be carried out with a variety of other mat constructions.

In accordance with the present disclosure, a volume of hot, molten thermoplastic 38 is applied to an external surface 40 of first mat 28 prior to forming table 22. More specifically, as noted in FIG. 1, first mat 28 is routed by way of guide rollers 42 beneath a coating device 44, which applies a uniformly thin layer 46 of liquefied plastic 38 over external surface 40 first mat 28 in a continuous in-line process. Any of a variety of hot melt thermoplastics can be utilized. In one non-limiting example, molten acrylonitrile butadiene styrene (ABS) plastic is used. In accordance with this disclosure, hot melt thermoplastic refers to a thermoplastic that is applied in a liquid state and that forms an adhesive bond upon cooling to a solid state.

Although ABS plastic is one example, any of the following plastics can also be used, alone or in combination with one another: Celluloid, Cellulose Acetate, Ethylene-Butyl Acrylate, Ethylene-Methyl Acrylate, Ethylene Vinyl Acetate (EVA), Ethylene Vinyl Alcohol (EVAL), Fluoroplastics (PTFEs, including FEP, PFA, CTFE, ECTFE, ETFE), Ionomers, Liquid Crystal Polymer (LCP), Metallocene, Polyacetal (POM or Acetal), Polyacrylates (Melt and Cure Acrylics), Polyacrylonitrile (PAN or Acrylonitrile), Polyamide (PA or Nylon), Polyamide-imide (PAI), Polyaryletherketone (PAEK or Ketone), Polybutadiene (PBD), Polybutylene (PB), Polybutylene Terephthalate (PBT), Polybutylene Terephthalate (PET), Polycyclohexylene Dimethylene Terephthalate (PCT), Polycarbonate (PC), Polyketone (PK), Polyester, Polyethylene/Polythene/Polyethene, Polyether Block Amide (PEBA), Polyetheretherketone (PEEK), Polyetherimide (PEI), Polyethersulfone (PES), Polyethylenechlorinates (PEC), Polyimide (PI), Polylactic Acid (PLA), Polymethylpentene (PMP), Polyphenylene Oxide (PPO), Polyphenylene Sulfide (PPS), Polyphthalamide (PPA), Polypropylene (PP), Polystyrene (PS), Polysulfone (PSU), Polyvinyl Chloride (PVC), Spectralon, thermoplastic Olefinic Elastomer (TPO).

The thermoplastic pre-coating can be any of the foregoing hot melt thermoplastics or various blends thereof. The holt melt thermoplastic may also incorporate secondary additives blended into said hot melt thermoplastic to impart specific enhancements to the precoating, the precoated fibrous mat, or the resulting building panel. These secondary additives may provide improved strength, improved flexibility, improved hardness, improved impact resistance, improved abrasion resistance, UV resistance, mold and mildew resistance, bacterial resistance, viral resistance, formaldehyde scavenging, carbon dioxide scavenging, structural characteristics, improved fire resistance, EMF resistance (as a shielding sheathing, interior wall board, roof deck board, or underlayment), frequency specific resistance (as a shielding sheathing, interior wall board, roof deck board, or underlayment), solar collecting (as a roofing panel), piezoelectric energy generation (as an underlayment), water drainage, or improved sound resistance.

Figure 4:
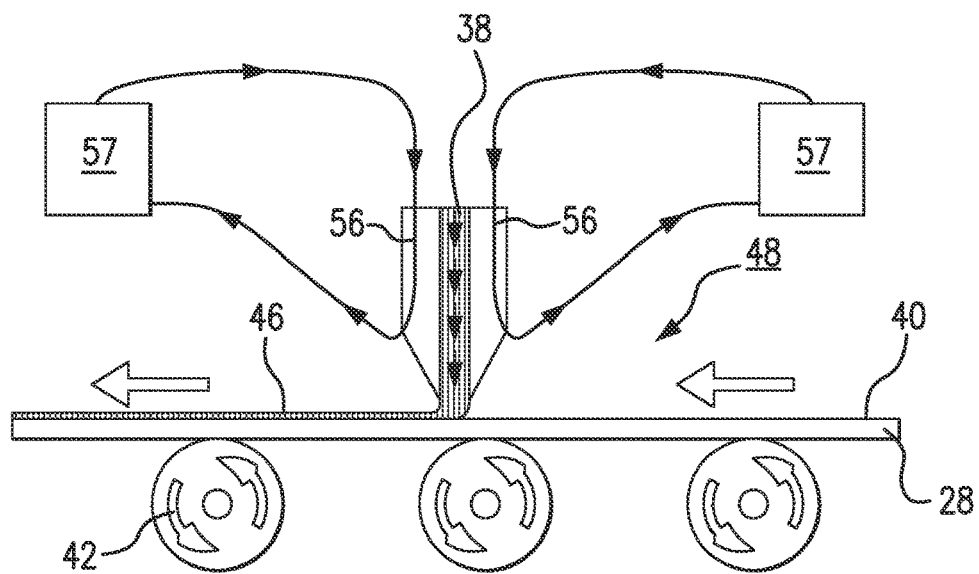
FIG. 4 is a detailed view of the curtain coater and/or slot die coater used in applying a thermoplastic layer.
Figure 5:
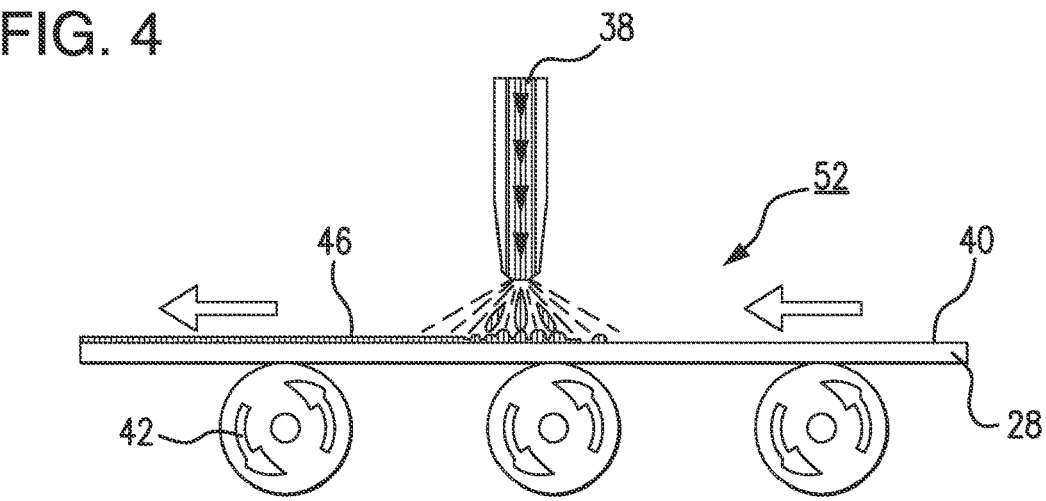
FIG. 5 is a detailed view of a spray coater used in applying a thermoplastic layer.
Figure 6:
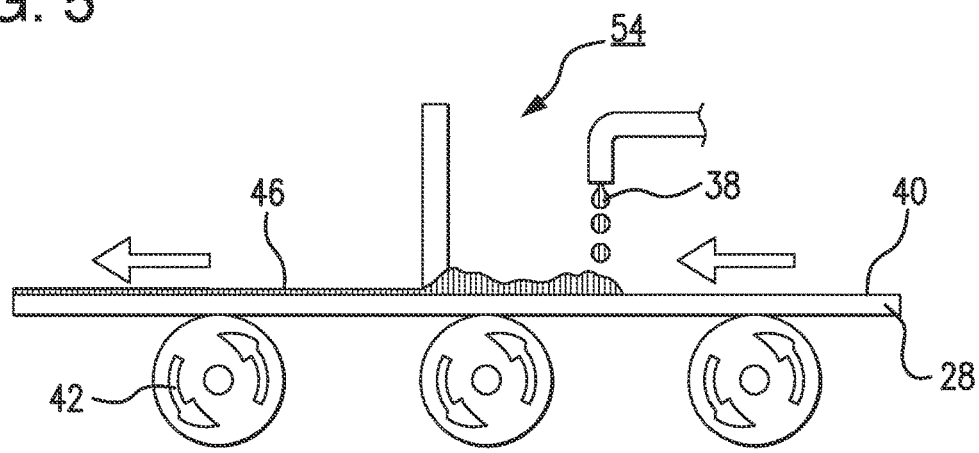
FIG. 6 is a detailed view of a knife coater used in applying a thermoplastic layer.

The present disclosure also contemplates using any of a variety of coating devices 44. The preferred coating apparatus is a curtain coater 48 and/or slot die coater and is illustrated in FIG. 4. However, a spray coater 52 (FIG. 5) or a knife coater 54 (FIG. 6) can alternatively be used. The hot melt thermoplastic can alternatively be applied to the fibrous mat via a hot melt roll coater, forward, reverse, or multi-stage forward and reverse application methods. Still yet other alternatives include a hot melt slot coater, or a hot melt flow coater. An emersion bath can also be employed. Whatever coating device is employed, it is preferred to position the coating device 44 in-line with the remaining components of production line 20. In still yet other embodiments, off-line coating processes can be employed.

Whatever coating device 44 is used, a uniform layer 46 of the hot thermoplastic 38 should be applied in a continuous process. However, it is within the scope of the present invention to apply layer 46 non-uniformly or to control the porosity layer 46. It is also preferred that layer 46 be thin with a thickness of approximately 0-50% of the thickness of underlying mat 28. However, in the preferred embodiment, layer 46 has a thickness that is between approximately 1% to 10% of the thickness of mat 28. It is also preferred that thermoplastic layer 46 have a minimum thickness weight of between approximately 0.01 g/sqft to 45 g/sqft. FIG. 3a illustrates the thermoplastic layer 46 applied to external surface 40 of mat 28. Once applied, layer 46 will generally cover between approximately 90% to 99.999% of the entire surface of mat 28. Thus, even after layer 46 is deposited, approximately less than 1% and up to 90% of the underlying mat 28 will be exposed. This exposed region will permit a limited degree of bleed through by the deposited slurry. FIG. 3f is a bottom plan view showing the slurry bleeding through the surface of the board.

Coating device 44 may also include internal channels 56 within which a heating fluid, such as a hot oil from reservoir 57, may be circulated (note FIG. 4). These channels 56, thereby, act as a heat exchanger to raise or maintain the temperature of the plastic 38 prior to its application. This ensures that thermoplastic 38 remains in a molten or liquefied state prior to its delivery upon mat 28. The coating head may also have electrically heated elements contained integrally or any other means of providing stable elevated temperature of said thermoplastic delivery apparatus 44.

After thermoplastic layer 46 has been applied, mat 28 is routed over additional guide rollers 42 prior to arriving at forming table 22. This gives the molten thermoplastic layer 46 sufficient time to come into contact with the ambient air and cool. Layer 46, however, is still warm as it travels over forming table 22. Additionally, thermoplastic layer 46 is permitted to adhere to the external surface 40 underlying mat 28, as well as to the individual fibers comprising mat 28, prior to forming tables 22.

Mat 28 with the applied thermoplastic layer 46 is also inverted prior to arriving at forming table 22. This inversion is achieved via one or more guide rollers 42. More specifically, after thermoplastic layer 46 has been applied, mat 28 is turned upside down to expose the internal uncoated surface 58 of mat 28. This results in thermoplastic layer 46 contacting and facing underlying forming table 22. It also results in interior surface 58 of first mat 28 being exposed. This is noted in the cross section of FIG. 3B.

Subsequent downstream processing may include the application of a first gypsum slurry layer 62, and the passage of the slurry layer and mat through a pair of roller coaters 64. This results in the creating of a first dense slurry layer adjacent the exposed internal surface 58 of first mat 28. Layer 46 will still be warm as first gypsum slurry layer 62 is applied. Slurry 62, as well as the additional slurry that is deposited downstream, will assist in cooling thermoplastic layer 46. As slurry 62 is deposited, thermoplastic layer 46 is expanded and slightly displaced.

Vibrators 65 are preferably spaced along the length of forming tables 22 to ensure the uniform distribution of slurry and the elimination of voids. The vibrators also act in embedding mat 28 within the deposited gypsum. Thereafter, additional gypsum slurry 66 is applied over the interior surface 58 to form the core of building board 24 (note FIG. 3c). The deposited gypsum slurry 66 is preferably delivered from a overhead mixer 36. Slurry 66 will act in further cooling and displacing thermoplastic layer 46. This, in turn, permits a thin layer of slurry 68 to be formed between the external surface 40 of first mat 28 and thermoplastic layer or barrier 46 (FIG. 3d).

As is known in the art, additives can be included in the gypsum slurry to achieve desired performance characteristics, such as polymers to provide increased strength and reduced weight. One suitable polymer additive is a styrene butadiene latex that is substantially stable against divalent ions.

The fibers of the first mat are sufficiently spaced to permit core slurry 66 to fully penetrate the individual glass fibers. This ensures that individual fibers are coated and that mat 28 is completely penetrated. This, in turn, results in the applied gypsum (62 or 66) coating the exterior surface 40 of mat 28. Thermoplastic coating 46, however, limits the amount of deposited slurry (62 or 66) that contacts the forming belts 22. In this manner, thermoplastic coating 46 acts as a barrier preventing the discharge of slurry from the exterior surface 40 of mat 28. This prevents forming table 22, as well as associated belts, pulleys, and motors, from getting contaminated by gypsum or gypsum particles.

Thermoplastic barrier 46 and thin gypsum layer 68 together prevent fiber disengagement from mat 28. Barrier 46 and layer 68 also impart desired physical properties to the resulting building board 24. FIG. 3C is a cross section of board 24 immediately after the gypsum slurry 66 has been applied to interior surface 58. As noted, slurry 66 does not immediately penetrate mat 28. FIG. 3D is a depiction of the subsequent cross section after gypsum slurry 66 has had time to fully penetrate the thickness of mat 28 and encounter thermoplastic barrier 46. Because layer 46 is only applied to between 90% to 99.999% of mat 28, a limited amount of slurry 66 will bleed through to the external surface of the building board.

Thereafter, a second length of mat 32 is deposited over top of gypsum slurry core 66. This second mat 32 can likewise comprise a plurality of non-woven randomly aligned glass fibers. Second mat 32 may have a small volume of gypsum 72 applied to its surface before it is applied to gypsum core 66. Thereafter the resulting panel 24 is formed into a desired thickness by way of a forming plate 74 and pinch point 76.

In accordance with conventional gypsum board manufacturing techniques, the resulting panel is then delivered to a series of board dryers 26 (FIG. 2). Dryers 26 are utilized heating the gypsum slurry within the panels and vaporizing any non-crystalline water. Four dryer zones are preferably included. However, the number of dryer zones employed is not critical to the present invention. Dryers are designed to heat the building boards 24 to a degree sufficient to cure the gypsum. This is typically achieved at a temperature of approximately 212° F. The presence of entrained water within the gypsum core will delay the temperature of the gypsum core from raising above 212° F. Dryers of the depicted embodiment utilize a conventional construction and run at temperature levels that range anywhere between approximately 180° F. to 650° F., which is typical for gypsum drying operations. As a result of this heating process, water is vaporized at the surface and delivered upwardly through second mat 28. Panel 24 can then be cut to desired lengths depending upon the intended use. Notably, thermoplastic layer 46 is not dissolved in dryers 26 and remains intact upon the final cut panels 24.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A system for manufacturing building boards along a production line, the system comprising:
   a roll of a first glass mat, the first mat having interior and exterior surfaces;
   a coating apparatus and a supply of a hot melt thermoplastic, the coating apparatus being configured to apply a thin layer of the hot melt thermoplastic on the exterior surface of the first glass mat;
   guide rollers for inverting the first glass mat after the application of the hot melt thermoplastic, the guide rollers configured to allow the applied thermoplastic coating to partially cool;
   a series of forming tables positioned downstream of the coating apparatus, the guide rollers configured to deliver the first mat with the thermoplastic coating to a forming table, wherein the adhered thermoplastic coating faces the forming table and the interior surface of the first mat is exposed.

2. The system as described in claim 1 further comprising a mixer positioned downstream of the coating apparatus, the mixer storing a volume of slurry and having an outlet for depositing the slurry over the interior surface of the first mat, wherein the thermoplastic coating acts as a barrier in preventing deposited slurry from contacting the underlying forming belt.

3. The system as described in claim 2 configured such that the deposited gypsum slurry is permitted to fully penetrate the first mat, wherein the deposited gypsum slurry forms a small layer between the contacting surface of the first mat and the thermoplastic coating.

4. The system as described in claim 2 further comprising a roll of a second mat, configured to apply the second mat over the gypsum slurry, wherein the first mat, the second mat, the gypsum slurry and the thermoplastic coating together form a panel.

5. The system as described in claim 1 wherein the coating apparatus is in-line with the production line.

6. The system as described in claim 1 wherein the coating apparatus is a curtain coater.

7. The system as described in claim 1 wherein the coating apparatus is a spray coater.

8. The system as described in claim 1 wherein the coating apparatus is a knife coater.

9. The system as described in claim 1 wherein the coating apparatus is a slot die.

10. The system as described in claim 1 configured to provide the thermoplastic in a layer having a thickness weight of between approximately 0.01 g/sqft to 45 g/sqft.

11. A system for manufacturing building boards, the system utilizing a forming table and a mixer for supplying a slurry, the system further comprising:
    a roll of a mat, the mat having interior and exterior surfaces;
    a coating apparatus positioned in-line with the forming table and the mixer, the coating apparatus containing a supply of a thermoplastic and configured to supply a layer of the thermoplastic on the exterior surface of the mat.

12. The system as described in claim 11 further comprising guide rollers for inverting the mat after the application of the thermoplastic, the guide rollers being configured to allow the applied thermoplastic coating to partially cool.

13. The system as described in claim 11 wherein the thermoplastic is a hot melt thermoplastic.

14. The system as described in claim 11 further comprising a curtain coater configured to apply the thermoplastic.

15. The system as described in claim 11 wherein the thermoplastic is a molten acrylonitrile butadiene styrene (ABS).

16. A system as described in claim 1 wherein the first mat and the second mat are precoated with thermoplastic.

17. A system as described in claim 1 wherein either the first mat or the second mat is precoated with thermoplastic.

* * * * *